United States Patent
Hagaribommanahalli Yeriyappa et al.

(10) Patent No.: US 12,522,192 B2
(45) Date of Patent: Jan. 13, 2026

(54) VEHICLE ACCELERATOR PEDAL RESPONSIVENESS ADJUSTER

(71) Applicant: Nissan North America, Inc., Franklin, TN (US)

(72) Inventors: Sachin Hagaribommanahalli Yeriyappa, Sunnyvale, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 260 days.

(21) Appl. No.: 18/228,583

(22) Filed: Jul. 31, 2023

(65) Prior Publication Data
US 2025/0042384 A1    Feb. 6, 2025

(51) Int. Cl.
| B60W 40/00 | (2006.01) |
| B60W 10/02 | (2006.01) |
| B60W 40/09 | (2012.01) |
| B60W 40/105 | (2012.01) |
| B60W 50/08 | (2020.01) |
| B60W 50/00 | (2006.01) |

(52) U.S. Cl.
CPC .......... *B60W 10/024* (2020.02); *B60W 40/09* (2013.01); *B60W 40/105* (2013.01); *B60W 50/082* (2013.01); *B60W 2050/0083* (2013.01); *B60W 2540/10* (2013.01); *B60W 2554/4046* (2020.02); *B60W 2555/60* (2020.02); *B60W 2556/10* (2020.02)

(58) Field of Classification Search
None
See application file for complete search history.

(56) References Cited

U.S. PATENT DOCUMENTS

| 5,320,076 | A | * | 6/1994 | Reppich | F02D 41/222 |
| | | | | | 123/399 |
| 5,391,127 | A | * | 2/1995 | Nishimura | F02D 11/105 |
| | | | | | 477/110 |
| 5,692,472 | A | * | 12/1997 | Bederna | F02D 11/107 |
| | | | | | 123/350 |
| 5,711,712 | A | * | 1/1998 | Graf | B60W 10/06 |
| | | | | | 477/121 |
| 9,051,884 | B2 | * | 6/2015 | Min | F02D 11/02 |
| 10,632,985 | B2 | * | 4/2020 | Jo | B60W 20/15 |
| 10,832,261 | B1 | * | 11/2020 | Chan | G06Q 30/0255 |
| 11,292,476 | B2 | * | 4/2022 | Scofield | A61B 5/02055 |
| 11,409,281 | B2 | * | 8/2022 | Yamaguchi | H04W 4/46 |
| 2001/0039939 | A1 | * | 11/2001 | Nada | F16H 59/22 |
| | | | | | 123/399 |

(Continued)

*Primary Examiner* — Jonathan M Dager
(74) *Attorney, Agent, or Firm* — Young Basile Hanlon & MacFarlane, P.C.

(57) ABSTRACT

A mean of real-time accelerator pedal output of a vehicle that quantifies an extent to which an accelerator pedal has been pressed by a driver of the vehicle over a defined period of time is determined. Target mean accelerator pedal output for the vehicle is determined. Torque of the vehicle is changed. The torque is reduced when the mean of the real-time accelerator pedal output is lower than the target mean accelerator pedal output, and the torque is increased when the mean of the real-time accelerator pedal output is higher than the target mean accelerator pedal output.

20 Claims, 8 Drawing Sheets

(56) References Cited

U.S. PATENT DOCUMENTS

| | | | |
|---|---|---|---|
| 2004/0249533 A1* | 12/2004 | Wheals | B60T 8/172 |
| | | | 701/1 |
| 2009/0021203 A1* | 1/2009 | Claeys | B60L 50/61 |
| | | | 180/65.285 |
| 2010/0145588 A1* | 6/2010 | Reuschel | B60W 10/06 |
| | | | 701/70 |
| 2010/0198456 A1* | 8/2010 | Komori | B60W 40/09 |
| | | | 701/33.4 |
| 2010/0209881 A1* | 8/2010 | Lin | G09B 19/167 |
| | | | 434/66 |
| 2010/0209883 A1* | 8/2010 | Chin | G09B 19/167 |
| | | | 434/65 |
| 2010/0274435 A1* | 10/2010 | Kondoh | B60K 35/21 |
| | | | 701/31.4 |
| 2012/0316699 A1* | 12/2012 | Filev | B60W 50/085 |
| | | | 701/1 |
| 2017/0004663 A1* | 1/2017 | Yasui | G01P 21/02 |
| 2017/0088135 A1* | 3/2017 | Kelly | B60W 10/184 |
| 2017/0137030 A1* | 5/2017 | Fujita | B60W 50/10 |
| 2018/0298841 A1* | 10/2018 | Uchida | B60K 6/445 |
| 2022/0340006 A1* | 10/2022 | Mizukami | B60K 26/021 |
| 2023/0143408 A1* | 5/2023 | Dobashi | B60W 40/105 |
| | | | 701/93 |

\* cited by examiner

VEHICLE ACCELERATOR PEDAL RESPONSIVENESS ADJUSTER

TECHNICAL FIELD

This disclosure relates generally to vehicle accelerator pedals, and more particularly to adjusting vehicle accelerator pedal responsiveness.

BACKGROUND

A vehicle may traverse across sections of a transportation network, such as a road, primarily through a driver's control of an accelerator pedal. This engagement with the accelerator pedal generates torque, which is subsequently converted into vehicle's speed. The manner and skill with which the accelerator pedal is operated can significantly influence a vehicle's operation and an efficiency, and an overall driving experience of a driver.

SUMMARY

A first aspect of the disclosed implementations is a method for adjusting an accelerator pedal responsiveness. The method includes determining a mean of a real-time accelerator pedal output of a vehicle that quantifies an extent to which an accelerator pedal has been pressed by a driver of the vehicle over a defined period of time; determining a target mean accelerator pedal output for the vehicle; and changing a torque of the vehicle based on the target mean accelerator pedal output. Changing the torque of the vehicle includes reducing the torque when the mean of the real-time accelerator pedal output is lower than the target mean accelerator pedal output, and increasing the torque when the mean of the real-time accelerator pedal output is higher than the target mean accelerator pedal output.

A second aspect of the disclosed implementations is an apparatus for adjusting a real-time accelerator pedal output. The apparatus includes a memory and a processor. The processor is configured to: determine a mean of the real-time accelerator pedal output of a vehicle that quantifies an extent to which an accelerator pedal has been pressed by a driver of the vehicle over a defined period of time; determine a target mean accelerator pedal output for the vehicle; and change a torque of the vehicle based on the target mean accelerator pedal output. To change the torque of the vehicle can correspond to reduce the torque when the mean of the real-time accelerator pedal output is lower than the target mean accelerator pedal output, and increase the torque when the mean of the real-time accelerator pedal output is higher than the target mean accelerator pedal output.

A third aspect of the disclosed implementations is a non-transitory computer readable medium storing instructions operable to cause one or more processors to perform operations that include: determining a mean of real-time accelerator pedal output of a vehicle that quantifies an extent to which an accelerator pedal has been pressed by a driver of the vehicle over a defined period of time; determining a target mean accelerator pedal output and a target variance for the vehicle based on a type of a road that the vehicle is traversing; and changing a sensitivity of the accelerator pedal based on the target variance.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
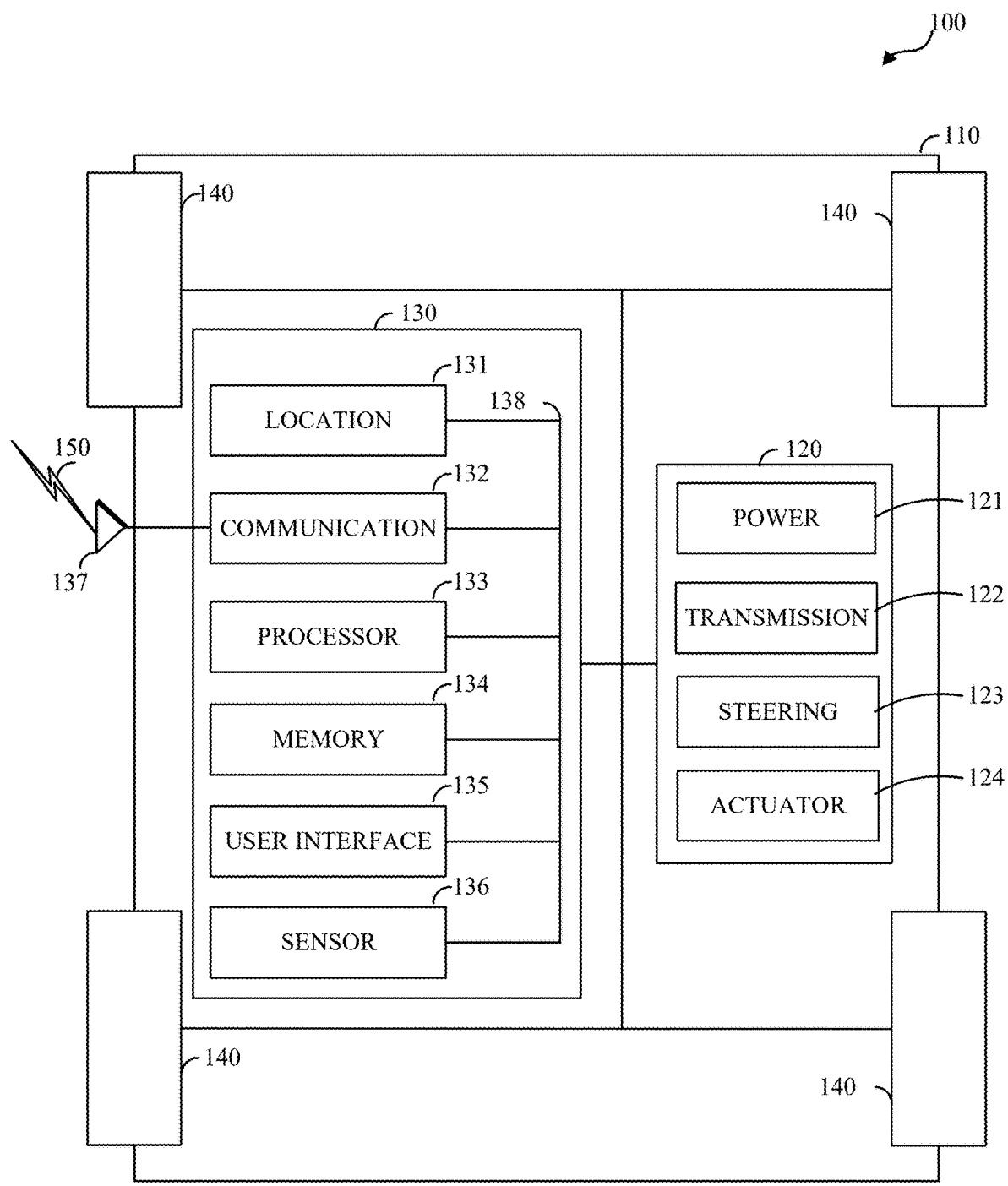
FIG. 1 is a diagram of an example of a vehicle in which the aspects, features, and elements disclosed herein may be implemented.

The modality and adaptability of a driver in operating or pressing an accelerator pedal (pedal) affect the performance, efficiency, and/or overall driving experience. Several issues, however, emerge in relation to the operation and responsiveness of the accelerator pedal, especially in electric vehicles.

In electric vehicles (EVs), an accelerator pedal (e.g., throttle pedal) functions similarly to that of a traditional internal combustion engine vehicles. When a driver presses down on the accelerator pedal, signal is sent to the vehicle's engine control unit (ECU), which then instructs the motor controller to deliver more power to the electric motor. However, unlike traditional internal combustion engine vehicles, EVs don't rely on a mechanical connection between the pedal and the motor. Instead, the signal from the accelerator pedal is interpreted by the ECU, which adjusts the power output of the electric motor accordingly. This signal is usually based on a position of the pedal, a depth of pedal press, a rate at which it is depressed, and/or other factors like the vehicle's speed and the desired level of acceleration. With regards to braking of the EVs, there are different approaches. Some EVs use a regenerative braking system, where the electric motor acts as a generator, converting the kinetic energy of the moving vehicle back into electrical energy. When the driver releases the accelerator pedal or apply light pressure on it, the motor may switch into generator mode, slowing down the vehicle. This regenerative braking can effectively slow down the vehicle and even bring it to a complete stop in some situations. However, many EVs still incorporate traditional hydraulic or electromechanical brakes for more substantial deceleration and emergency stops. In these cases, the brake pedal is present, and pressing it activates the brake calipers or pads to create friction with the rotors or drums, effectively slowing down the vehicle.

Some EV models offer a feature called "one-pedal driving" (e.g., Nissan e-Pedal), where the regenerative braking is strong enough to bring the vehicle to a complete stop without having to use the brake pedal. By releasing the accelerator pedal completely, the regenerative braking engages, providing significant deceleration. This driving style allows the driver to control the vehicle's speed using just the accelerator pedal, effectively integrating acceleration and braking into a single pedal operation.

Novice or inexperienced drivers often struggle with mastering smooth pedal operation. Their inexperience may result in a lack of skill and/or precision in pressing the pedal, leading to abrupt and potentially uncomfortable rides. Such drivers often desire to train their pedal pressing skills or change their pedal pressing behavior. Moreover, such drivers often desire to make quick improvements to hone their pedal pressing skills or pedal operation skills. On the other hand, such drivers often desire gradual, tiered approach to hone their pedal pressing or pedal operation skills, allowing for incremental improvements that cater to their individual learning curve.

Moreover, for example, experienced drivers may seek greater autonomy and flexibility (e.g., wider spectrum in pressing the pedal) in pedal operation as opposed to practicing or training their pedal pressing skills. For example, they may want to press the pedal deeper than default or current settings of sensitivity to maintain their speed or range of speed. However, such autonomy and flexibility can be prevented by overly sensitive pedals, where small adjustments (e.g., a slight or small change in the pressure or position applied to the accelerator pedal) can result in substantial torque changes or speed changes. This sensitivity can compromise the driver's control over the vehicle, rendering the driving experience less enjoyable.

Moreover, for example, some drivers wish to experience different flexibility options (e.g., different control and adaptability options when using the vehicle's pedals) in pressing the pedal and find a suitable option among different flexibility options that aligns with their comfort and skill, and adapt to such suitable option to enhance their driving experience.

Accordingly, various issues and preferences in pedal operation highlight an absence of current systems that are capable of adequately addressing this issue of inexperienced drivers desiring to train their pedal pressing skills or change their pedal pressing behavior or other drivers wanting to experience different flexibility options that align with their preference, comfort, and/or skill. Further, there are no existing technology that offers drivers to change or train their pedal pressing behavior based on reference model or reference driver's pedal pressing behavior. There are no existing methodologies that are capable of improving or customizing the pedal pressing behavior or pedal responsiveness.

Implementations according to this disclosure can personalize pedal pressing behavior to the expectations of a driver by at least determining real-time accelerator pedal output (APO) that quantifies an extent to which an accelerator pedal has been pressed by the driver of the vehicle over a defined period of time (e.g., few days, few weeks, few months), and making adjustments (e.g., by modifying an accelerator torque output and/or sensitivity of an accelerator pedal) based on reference pedal pressing behavior data (or behavior). Moreover, based on these adjustments, the driver may adapt to such reference driver's pedal pressing behavior data.

Based on the real-time APO or pedal pressing behavior of the driver, a real-time frequency or a real-time probability distribution map (e.g., distribution curve) for such pedal pressing behavior or the real-time APO can be generated. Such real-time APO distribution map can be compared to a reference distribution map corresponding to the reference pedal pressing behavior data, and the adjustments can be made such that the real-time probability distribution map is brought closer to or converged into the reference distribution map. For example, the adjustments can be made and it can be observed as to whether the real-time APO is being brought closer to the reference distribution map. For example, the real-time frequency or probability distribution map can be brought closer to the reference frequency or probability distribution map by tweaking parameters (e.g., mean, standard deviation, variance) of the real-time frequency or probability distribution curve. Such tweaking of parameters may also correspond to moment (e.g., mean, standard deviation, variance) matching, which is a statistical technique.

The reference distribution map can be based on a stored reference data that represent observed pedal pressing behavior of different types of drivers or a reference driver (e.g., a model driver, expert driver) on different types of road segments (e.g., highway road, city road, urban road, rural road, etc.). Accordingly, the pedal pressing behavior of drivers can be trained to adapt to pedal pressing behaviors of the reference driver. Moreover, computing techniques described herein for personalizing pedal pressing behavior are computationally efficient and simple therewith resulting in a responsive pedal response.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission 122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the illustrated embodiment, the controller 130 includes a location unit 131, a communication unit 132, a processor 133, a memory 134, a user interface 135, a sensor 136, and a communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although not shown in FIG. 1, the controller 130 may include an engine control unit (ECU) (e.g., engine control module) and a Proportion-Integral-Derivate (PID) controller. Although shown as separate elements, the location unit 131, the communication unit 132, the processor 133, the memory 134, the user interface 135, the sensor 136, the communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the communication interface 137, the communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 is configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 includes a dedicated short-range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 are combined. Moreover, the sensor 136 can be or include an accelerator pedal position sensor (APPS) or throttle position sensor (TPS). It may then send this information to the controller 130, such as the ECU. The TPS may be located on the throttle body of the engine, and the TPS may send information to the ECU about the actual position of a throttle in the engine (e.g., the internal combustion engine). The APPS may monitor a position of an accelerator pedal (pedal) and how much the pedal is being pressed. The TPS may monitor position of the throttle in the engine. The throttle is essentially a valve that controls how much air can enter the engine. When a driver presses down on the accelerator pedal, the throttle opens more, allowing more air into the engine, which then allows for more fuel to be added, thus increasing power. When the driver releases the accelerator pedal, the throttle closes, reducing the amount of air (and therefore fuel) entering the engine, thus decreasing power.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an EV, as described above. Moreover, the vehicle 100 may be equipped with an e-Pedal functionality, which is designed to enable a one-pedal driving experience. The e-Pedal functionality allows for the control of acceleration, deceleration, stopping and holding of the vehicle using only the accelerator pedal as described above. Although not separately illustrated in FIG. 1, a vehicle with e-Pedal functionality may include a control unit that enables and manages the e-Pedal operations. This control unit may be integrated with other vehicle components and/or systems. For example, the controller 130 may include the e-Pedal control unit.

The vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
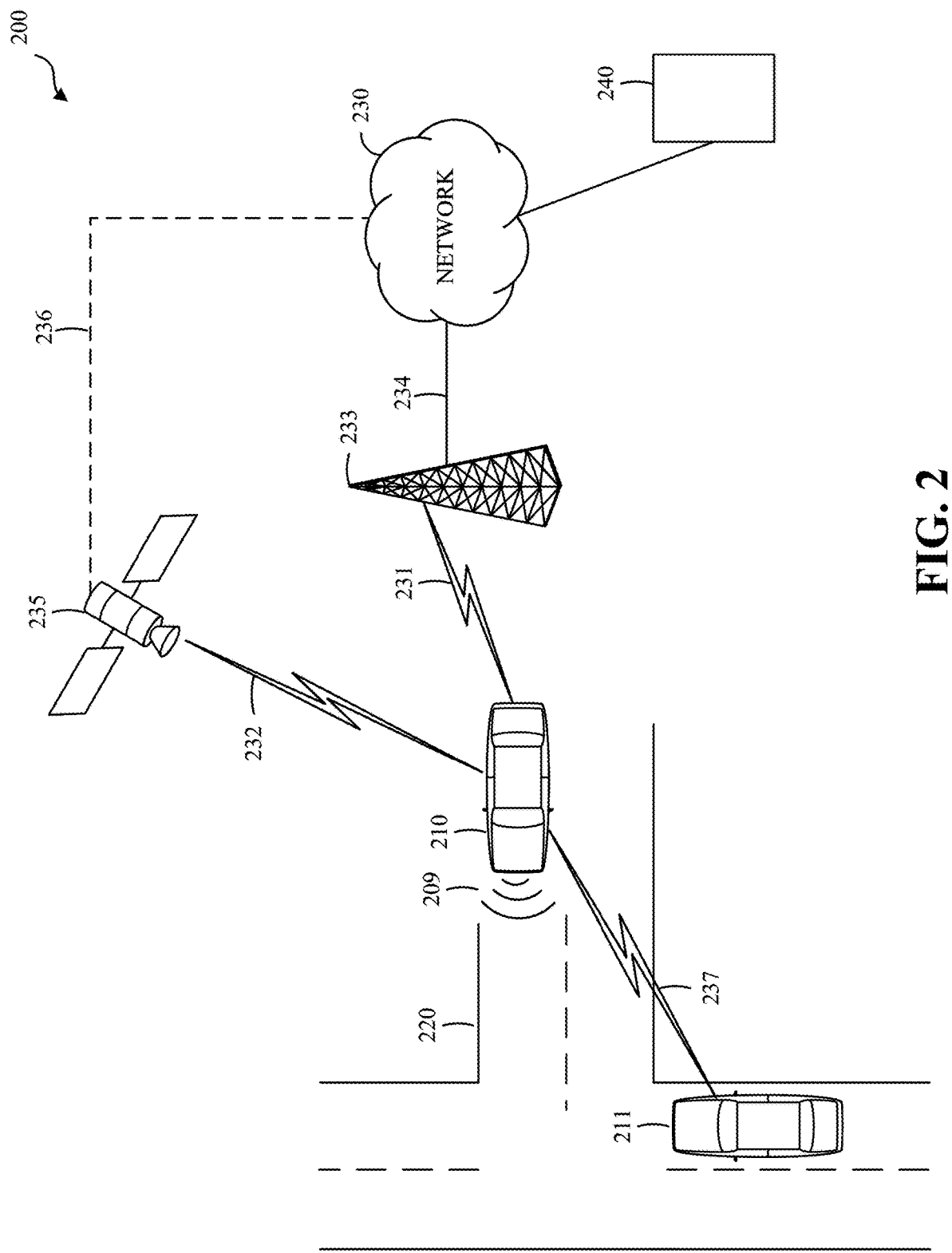
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more communication networks 230. Although not explicitly shown in FIG. 2, a vehicle may traverse an off-road area.

The communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the communication network 230.

In some embodiments, a vehicle 210/211 may communicate via a wired communication link (not shown), a wireless communication link 231, 232, 237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication A vehicle 210/211 may communicate with another vehicle 210/211. For example, a host, or subject, vehicle (HEV) 210 may receive one or more automated inter-vehicle messages, such as a basic safety message (BSM), from a remote, or target, vehicle 211, via a direct communication link 237, or via the communication network 230. The remote vehicle 211 may broadcast the message to host vehicles within a defined broadcast range, such as 300 meters. In some embodiments, the vehicle 210 may receive a message via a third party, such as a signal repeater (not shown) or another remote vehicle (not shown). A vehicle 210/211 may defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, is configured to communicate with a vehicle 210, with a communication network 230, with one or more communication devices 240, or with a combination thereof via wired or wireless communication links 231 or 234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the communications network 230 via a satellite 235, or other non-terrestrial communication device. The satellite 235, which may include a computing device, is configured to communicate with a vehicle 210, with a communication network 230, with one or more communication devices 240, or with a combination thereof via one or more communication links 232, or 236. Although shown as a single unit here, a satellite may include any number of interconnected elements.

A communication network 230 is any type of network configured to provide for voice, data, or any other type of electronic communication. For example, the communication network 230 may include a local area network (LAN), a wide area network (WAN), a virtual private network (VPN), a mobile or cellular telephone network, the Internet, or any other electronic communication system. The communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the communication network 230, such as information representing the vehicle transportation network 220, information identified by the at least one on-vehicle sensors 209, or a combination thereof.

Although FIG. 2 shows a vehicle transportation network 220, one communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the communication network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
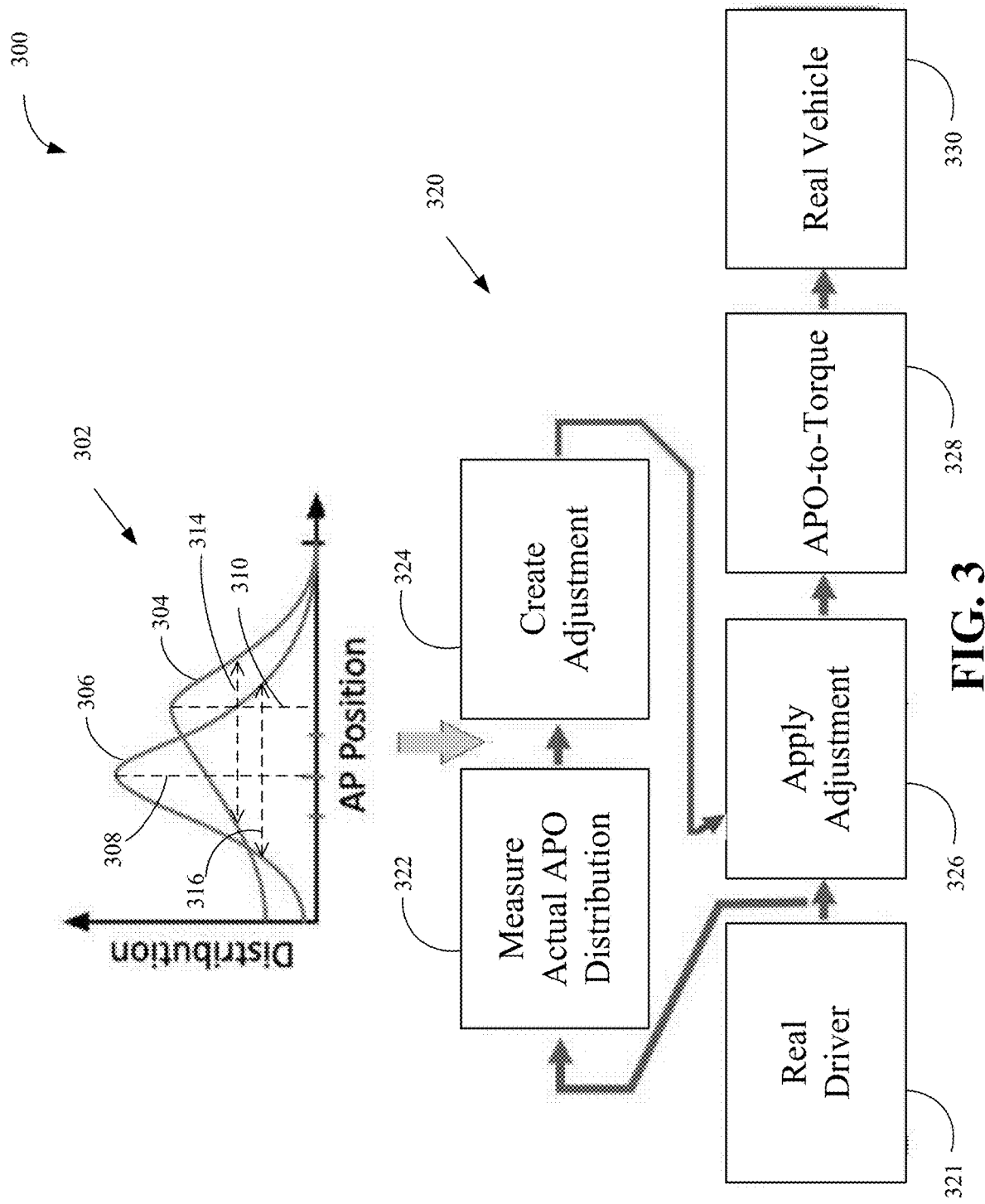
FIG. 3 depicts a diagram of an example of operations associated with pedal adjustments.

FIG. 3 depicts a diagram 300 of an example of operations associated with pedal adjustments. The pedal adjustments may correspond to real-time vehicle pedal accelerator output (APO) adjustment (that may lead to adjustment of an accelerator torque output) and accelerator pedal sensitivity adjustment. The example of operations depicted in the diagram 300 may be implemented by a processor, such as the processor 133 of a vehicle (e.g., the vehicle 100, the vehicle 210), a controller (such as the controller 130 that includes an ECU and an PID controller), sensor(s) of the vehicle (such as the sensors 136 that includes APPS and TPS), and other components of the vehicle.

First, plots 302 include two distribution curves (an actual APO distribution curve 304 and a target APO distribution curve 306 as a reference curve). A y-axis of the plots 302 illustrate a frequency or probability density and a x-axis of the plots 302 illustrate an accelerator pedal position or APO input. The APO input may represent an effort applied to the accelerator pedal (pedal), where the effort may correspond to how hard or how far the pedal is pressed from its initial position. For example, the APO input may correspond to a degree or an extent as to how much the pedal has been pressed. In other words, the APO input may correspond to a displacement or a depth of an accelerator pedal press, which can be measured in relevant units (e.g., percentage of total possible depth). Moreover, the frequency or the probability density on the y-axis of the plot 302 may represent frequency or probability of respective APO input.

The actual APO distribution curve 304 may represent a frequency distribution or a probability distribution based on real-time APO input. For example, the real-time APO input may be the APO input that is recognized by the APPS of the vehicle in real-time. For example, the actual APO distribution curve 304 may include a distribution of the real-time APO input that began from certain pre-determined date or time (e.g., 7 days ago, 2 weeks ago, etc.) until current time. For example, frequency distribution may illustrate a frequency of each outcome or the real-time APO input. For example, probability distribution may illustrate probability (e.g., probability based on division of each frequency by total number of observations) of each outcome or the real-time APO input. The term "real-time APO input" and "actual APO input" are equivalent and may be used interchangeably throughout this disclosure.

The target APO distribution curve 306 may represent a frequency distribution or a probability distribution based on a reference model representing reference APO input (e.g., recorded history of reference APO input, histogram of reference APO input). For example, the reference model may be based on recorded APO input of an expert driver on a certain road segment (e.g., city road, an urban road, a rural road, or a highway road). For example, the reference model may be based on an average value of recorded APO input of multiple drivers (e.g., multiple expert drivers, multiple normal drivers, multiple cautious drivers, multiple novice drivers, etc.) on the certain road segment. For example, the reference model may be based on an average value of recorded APO input of model novice driver or model intermediate drivers on the certain road segment. For example, since different types of the road segment have different speed limits (e.g., 35 mph in the city road, 65 mph in the highway road) and a pedal pressing behavior of the driver(s) may differ depending on different speeds, the reference model may vary based on the type of the road segment that the expert driver or the multiple drivers drove on.

A corresponding accelerator pedal position or APO input for a peak 308 of the target APO distribution curve 306 may correspond to a mean APO input or a target mean APO input. For example, the target mean APO input may be an ideal APO input or a target APO input at a certain driving speed in the certain road segment, which a normal or novice driver can adapt to, guided or controlled by an adjustment to the accelerator torque output (e.g., torque) and/or the sensitivity of the accelerator pedal. Stated another way, the target mean APO input may describe an average pedal pressing behavior of the expert driver or multiple drivers at the certain driving speed or speed range in the certain road segment, which the driver can adapt to such that the driver's pedal pressing behavior can be brought closer to an expert driver's pedal pressing behavior at that road segment.

For example, the pedal pressing behavior of the expert driver and/or the multiple drivers may be monitored or observed in highway (e.g., without a traffic jam) for a defined period of time (e.g., two weeks), and based on such behavior, the controller or the processor may determine the pedal pressing behavior (e.g., how hard or how far (or the displacement) the pedal is pressed from its initial position at certain speed (e.g., 65 mph) or certain speed range (e.g., 65-70 mph)). Such pedal pressing behavior may be averaged to determine the target mean APO, and this may also reflect the pedal pressing behavior of the expert driver or the multiple drivers, which the driver can adapt to.

Moreover, the pedal pressing behavior of the model novice driver(s) or model average driver(s) (represented by the reference model) may be observed in the certain road segment and used to determine the target mean APO. Such target mean APO based on model novice driver(s) or model average driver(s) may serve as a reference for other novice driver(s) or other average driver(s) to adapt to (e.g., guided or controlled by the adjustment to the torque and/or the sensitivity of the accelerator pedal). For example, such target mean APO may be used for those drivers who desire a gradual, tiered approach to hone pedal pressing or pedal operation skills, allowing for incremental improvements that cater to their individual learning curve.

Moreover, the target mean APO may be based on one or more factors in addition to the pedal pressing behavior represented by the reference model in the certain type of road segment. For example, one or more factors may include drive modes (e.g., comfort mode, sport mode, eco mode, snow mode, wet mode).

For example, for a driver to adapt to the pedal pressing behavior of the reference model, a corresponding APO input for a peak 310 of the actual APO distribution curve 304—mean of actual APO distribution curve 304 (actual mean APO)—should be brought closer to or be equal to the corresponding APO input for the peak 308 of the target APO distribution curve 306—target mean APO.

Moreover, a width of each of the two distribution curves (e.g., a width of the actual APO distribution curve 314, a width of the target APO distribution curve 316) may correspond to variability or how spread out data values (e.g., frequency data or probability data over APO) are or how much the data values deviate from the mean (e.g., the actual mean APO, the target mean APO). Such variablility of the respective distribution curve may be used to compute a standard deviation or a variance of the respective distribution curve.

The diagram 300 further illustrates a process 320 for determining the driver's pedal pressing behavior and creating and applying adjustments to the actual mean APO (that may lead to adjustment of the torque) and the accelerator pedal sensitivity such that the driver's pedal pressing behavior becomes closer to the reference driver(s)' pedal pressing behavior.

While a driver 321 is driving a vehicle 330, the actual APO data are captured in real-time. After some time has elapsed (e.g., two days, one week, two weeks, pre-determined time, or after a predefined number of driving hours of obtaining actual APO data), at 322, the processor or the controller may generate or identify an actual APO distribution (e.g., the actual APO distribution curve 304) corresponding to the actual APO data. Respective distributions may be identified for different road segment types. Depending on a type of road segment the vehicle is currently traversing, the processor or the controller may determine or select the target mean APO. For example, since different types of the road segment have different speed limits (e.g., 35 mph in the city road, 65 mph in the highway road), the target mean APO may vary (e.g., 35% APO in the city road, 30% APO in the highway road) based on the type of the road segment.

At 324, after the target mean APO is selected, the processor or the controller of the vehicle can create the adjustment to the actual mean APO and/or the sensitivity of the accelerator pedal. For example, the ECU or the PID controller of the controller may modify, convert, or map (collectively "adjust") the actual APO input into different APO value (e.g., APO_out or "second pedal effort" as described below with respect to FIGS. 5A-5C) which may be recognized by the ECU or the engine to generate the accelerator torque output. The accelerator torque output may refer to the torque generated after the accelerator pedal is pressed and/or corresponding APO_input is adjusted by the ECU or the PID controller to the APO_out, in which the torque indicates the power or force being delivered to propel the vehicle or machine forward. As such, adjustment of the actual APO may lead to adjustment of the torque such that the actual mean APO can be brought closer to the target mean APO.

Moreover, after the target mean APO is selected, the ECU or the PID controller of the vehicle can create the adjustment to the sensitivity of the accelerator pedal such that, as a consequence, the standard deviation or the variance of the actual APO distribution curve or around the actual mean APO can be brought closer to the standard deviation or the variance of the target APO distribution curve or around the target mean APO.

Creating the adjustment is further described below and with respect to FIGS. 4A-4C, 5A-5C, 7, and 8. At 326, such adjustment to the torque or the sensitivity of the accelerator pedal may be applied to the vehicle 330, such that the adjustment can induce modification of the actual mean APO in a direction towards the target mean APO.

For example, on the highway road, assume that the target mean APO is 30% at 65 mph, and the driver 321 is driving or has driven at the actual mean APO of 25% at around 70 mph. In this scenario, as the target mean APO is higher than the actual mean APO, the driver is, on average, pressing the pedal to a lesser extent than the target mean APO. As such, to make the driver 321 adapt to the pedal pressing behavior of the reference model, the driver 321 may have to press the pedal more or deeper to get the actual mean APO closer to the target mean APO. In order to make the driver 321 press the pedal more, the torque that is being converted to a current speed (e.g., around 70 mph) may have to be reduced (e.g., adjusted, changed) such that the current traveling speed can be reduced and the driver 321 needs to press the pedal more to maintain the current traveling speed or the driver 321 is induced to adjust their pedal pressing behavior, such that the actual mean APO is skewed toward (or brought closer to) the target mean APO. To reduce the torque, the actual APO input may have to be adjusted into different APO value (or APO_out). Although in this example, adjustment to the actual APO corresponds to adjusting the actual APO input to APO_out value that reflects the reduced APO input, the actual APO input can be adjusted such that APO_out value reflects either reduced or increased actual APO input. Stated another way, adjustment to the actual APO input can be made and applied in either direction (increasing or decreasing), and after the adjusted APO input or APO_out is converted into torque at step 328 and such torque is applied to the vehicle 330, it can be observed as to whether the actual mean APO is being brought closer to the target mean APO. When it is observed that the actual mean APO is brought closer to the target mean APO, such adjustment to the actual APO input can be continued in the same direction (increasing or decreasing). When it is observed that the actual mean APO is moving farther away from the target mean APO, such adjustment to the actual APO input can be reversed in the opposite direction.

For example, observing whether the actual mean APO is being brought closer to the target mean APO may include first computing an error (mean error) that corresponds to a difference between the target mean APO and the actual mean APO, and then determining whether such error is decreasing after the adjustment to the actual APO input is made and applied at step 324 and step 326, corresponding APO_out is converted into torque at step 328, and the torque is applied to the vehicle 330. For example, the error may correspond to a difference between the mean of the target APO distribution curve 306 (e.g., the target mean APO) and the mean of the actual APO distribution curve 304 (e.g., the mean of the actual APO, actual mean APO). To minimize the error, the mean of the actual APO distribution curve (e.g., the actual APO distribution curve 304) can be shifted left (in case the driver 321 needs to press the pedal to a lesser extent to be brought closer to the target mean APO) or shifted right (in case the driver 321 should press the pedal more to be brought closer to the target mean APO).

For example, to minimize the error, an error threshold condition (e.g., acceptable amount of error or difference between the target mean APO and the actual mean APO, margin of error) can be set. For example, if the error is decreasing, the actual APO input and thus the resulting torque can be continuously adjusted in that direction until the error reaches or falls within the error threshold condition (e.g., error to be no more than 1%). The duration it takes for the error to reach the error threshold condition may take from hours to days to weeks. In another example, such adjustment of the actual APO input and the torque may take place over defined period of time (e.g., three days, a week, two weeks) to train the driver's pedal pressing behavior such that the actual mean APO gets closer to the target mean APO.

Again, by adjusting the torque, the current speed can be reduced or increased such that the driver 321 may adapt to such torque adjustment. The driver may be induced to change pedal pressing behavior or press the pedal more or less, which can bring the actual mean APO closer to the target mean APO (which corresponds to the pedal pressing behavior of the reference driver(s) at speed limit or specific speed of the certain road segment) or bring the actual mean APO in a direction that reduces the error. If the actual mean APO moves farther away from the target mean APO or the error increases, actual APO input can be re-adjusted in the opposite direction (e.g., if the actual APO input was adjusted to be increased or output higher APO value (e.g., APO_out) previously and such resulted in the actual mean APO moving farther away from the target mean APO, then the actual APO input should be re-adjusted to be decreased or output reduced APO value (e.g., APO_out)).

Moreover, the processor or the controller of the vehicle can modify the sensitivity of the accelerator pedal such that variations around the actual mean APO can be reduced. For example, even after the torque has been adjusted and the driver 321 now presses the pedal according to the target mean APO on average (meaning that actual mean APO=the target mean APO), there may be fluctuations or variance around the actual mean APO. For example, on the highway road, assuming that the target mean APO is 30% and the driver 321 is now pressing the pedal on average to 30% actual mean APO, the driver 321 however may be pressing the pedal with a range of 25-35% APO with 30% APO on average. Having such fluctuation or variance around the actual mean APO may be normal, but such fluctuation or variance (or standard deviation) may be reduced. For example, the pedal pressing behavior represented by the reference model may exhibit lower fluctuation or variance (or standard deviation) around the mean compared to the pedal pressing behavior of the driver 321.

For example, when the target APO distribution curve 306, and the target mean APO are recorded and/or computed, the variance around the target mean APO may also be recorded and/or computed. For example, the reference driver(s) may be driving at around 64-66 mph on the highway road with 65 mph limit. In the same example, the reference driver may be driving at a range of 29-31% APO with a mean APO of 30%, and corresponding variance may be 0.005. Such corresponding variance may be a target variance that the driver 321 may be adapted to or aim for, such that the driver 321 may drive at around 64-66 mph with range of 29-31% APO instead of 25-35% APO.

For example, after adjusting (e.g., reducing or increasing) the sensitivity of the accelerator pedal, it can be observed whether an actual standard deviation or an actual variance around the actual mean APO is being brought closer to a target standard deviation or the target variance around the target mean APO. For example, observing may include first computing a variance error that corresponds to a difference between the target variance and the actual variance, and determining whether such variance error is decreasing after the adjustment to the sensitivity of the accelerator pedal is made and applied at step 324 and step 326, corresponding APO_out is converted into torque at step 328, and the torque is applied to the vehicle 330. For example, the variance error may correspond to a difference between a target variance based on the target mean APO of the target APO distribution curve 306 and an actual variance based on the actual mean APO of the actual APO distribution curve 304. To minimize the variance error, the width of the actual APO distribution curve (e.g., the width of actual APO distribution curve 314) can be narrowed, which corresponds to decreasing the variance by increasing the sensitivity of the accelerator pedal. By increasing the sensitivity of the accelerator pedal, the accelerator pedal may respond more sensitively as compared to the response prior to increasing the sensitivity of the accelerator pedal. Stated another way, when the sensitivity is increased, rate of change in speed or torque responsive to pedal press may be higher, and vice versa. For example, when the driver 321 presses the pedal at 30% APO and the driver presses the pedal deeper at 31% APO, then the processor may recognize or convert 1% difference to be more than 1% such that more APO is converted into torque than what it is supposed to be prior to increasing the sensitivity of the accelerator pedal. For example 1% difference in the actual APO input may correspond to 2% difference in APO_out. For example, the driver 321 may want to press the pedal less deep than before to maintain speed or range of speed. Similarly, when the driver 321 presses the pedal at 30% APO and the driver releases the pedal by 1% (which is equivalent to saying that the driver presses the pedal to a depth of 29% APO), then the processor, may recognize or convert the 1% difference to be more than 1% such that lesser APO is converted into torque than what it is supposed to be prior to increasing the sensitivity of the accelerator pedal.

By making the accelerator pedal more sensitive, the driver 321 may press the pedal more cautiously and/or with slightly lesser power range than before (e.g., prior to increasing the sensitivity of the accelerator pedal) to maintain target speed (e.g., 65 mph in the highway road) or deviate less from the target mean APO. For example, the range of 25-35% APO may be changed, after the sensitivity of the accelerator pedal has been increased and the driver presses the pedal more cautiously, to 29-31% APO.

In another example, there may be instances where the actual variance is less than the target variance. For example, in case the driver 321 has great expertise in driving consistently within target variance of the target mean APO (e.g., when the driver 321 is the expert driver) such that the driver 321 has pedal pressing behavior that yields less actual variance then the target variance, then the sensitivity of the pedal can be reduced such that the width of the actual APO distribution curve can be widened, thus increasing the variance by decreasing the sensitivity of the accelerator pedal. By decreasing the sensitivity of the accelerator pedal, the accelerator pedal may respond less sensitively than what is used to be prior to decreasing the sensitivity of the accelerator pedal. Stated another way, when driver 321 presses the pedal at 30% APO and the driver suddenly presses the pedal deeper at 31% APO, then the processor, the controller, ECU or the APPS may recognize 1% difference to be less than 1% such that less APO is converted into torque than what it is supposed to be prior to decreasing the sensitivity of the accelerator pedal.

For example, to minimize the variance error, variance error threshold condition (e.g., the variance error to be no more than 1%) can be set and it can be observed whether the actual variance is being brought closer to the target variance or whether the variance error is continuously being reduced to such variance error threshold condition. For example, if the error is decreasing or getting closer to variance error threshold condition, the sensitivity can be continuously adjusted in that direction until the variance error reaches the variance error threshold condition. In case the variance error is increasing (e.g., moving away from the variance error threshold) or the actual variance is moving farther away from the target variance, then direction of the adjustment of the sensitivity may be reversed. For example, if the sensitivity was increased previously which resulted in the actual variance moving farther away from the target variance, then the sensitivity may be decreased. The duration it takes for the variance error to reach the variance error threshold condition may take from hours to days to weeks. In another example, such adjustment of the sensitivity of the accelerator pedal may take place over defined period of time (e.g., three days, a week, two weeks) to train the driver's pedal pressing behavior such that the actual variance gets closer to the target variance.

Moreover, in some implementations, experienced drivers or drivers with great expertise in driving may seek greater autonomy and flexibility (e.g., wider spectrum in pressing the pedal) in pedal operation as opposed to practicing or training their pedal pressing skills. For example, they may want to press the pedal deeper than default or current settings of sensitivity to maintain their speed or range of speed. In such case, drivers with great expertise in driving may manually choose a flexible driving behavior model of the reference model, where the flexible driving behavior model has a high (or wide) target variance level. This may imply that a width of the target APO distribution curve may be wide. Moreover, such high target variance may trigger scenarios where the actual variance is less than the target variance as described above. For example, in case the driver 321 has great expertise in driving drives in a way such that the driver 321 has pedal pressing behavior that yields less actual variance then the target variance, then the sensitivity of the pedal can be reduced such that the width of the actual APO distribution curve can be widened, thus increasing the variance by decreasing the sensitivity of the accelerator pedal. By decreasing the sensitivity of the accelerator pedal, the accelerator pedal may respond less sensitively than what is used to be prior to decreasing the sensitivity of the accelerator pedal. Consequently, the driver 321 or drivers with great expertise in driving may experience greater autonomy and flexibility (e.g., wider spectrum in pressing the pedal) in pedal operation.

Moreover, in some implementations, some drivers wish to experience different flexibility options (e.g., different control and adaptability options when using the vehicle's pedals) in pressing the pedal and find a suitable option among different flexibility options that aligns with their comfort and skill, and adapt to such suitable option to enhance their driving experience. Such flexibility options may be based on different variations and combinations among target APO and target variance.

At 328, after creating the adjustment to the actual APO input and/or the sensitivity of the accelerator pedal and applying such adjustment to the vehicle 330, current APO may be converted into the torque of the vehicle 330 so as to change or maintain the current speed of the vehicle 330. The driver 321 of the vehicle 330 may be induced to respond to such change (e.g., in torque and/or pedal sensitivity). For example, the driver 321 may be induced to modify the actual mean APO and actual variance as described above. A cycle of the process 320 may repeat until the mean and/or the variance of the actual APO are brought closer to or equivalent to the target mean APO and/or the target variance. For example, the cycle of the process 320 may repeat until the error related to the actual mean APO reaches or falls within the error threshold and/or until the variance error reaches or falls within the variance error threshold as described above.

Figures 4A, 4B, 4C:
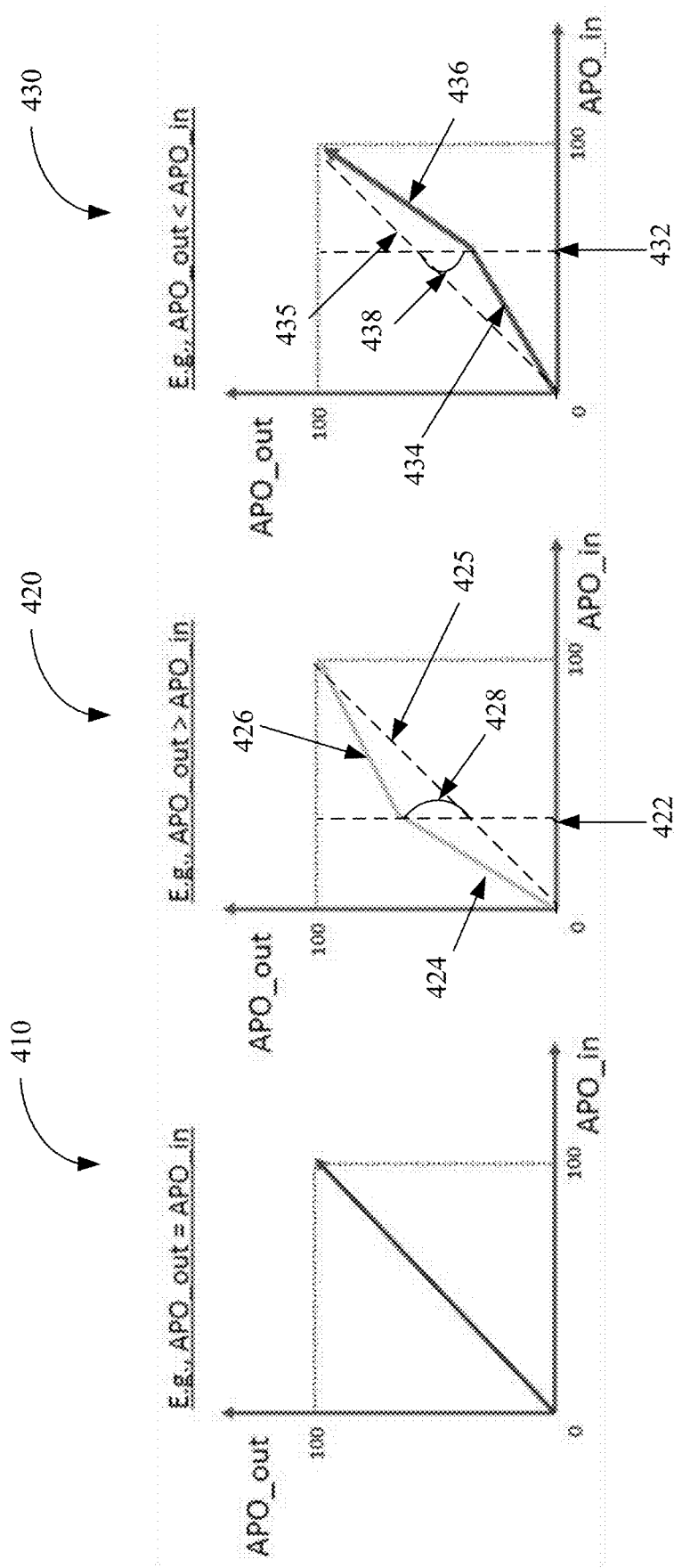
FIGS. 4A-4C depict example graphs illustrating different scenarios for creating and applying pedal adjustments.

FIGS. 4A-4C depict example graphs (e.g., a first graph 410, a second graph 420, and a third graph 430) illustrating different scenarios for creating and applying pedal adjustments (such as the adjustment described with respect to step 324 and 326 of FIG. 3).

In each of the first graph 410, the second graph 420, and the third graph 430 the x-axis illustrates APO_in values and the y-axis illustrates APO_out values. APO_in may correspond to an APO input (e.g., the actual APO input, or the real-time APO) as described above. APO_in represents the degree or the extent to which the pedal has been pressed.

For case of explanation, the real-time APO or the APO_in may be referred herein as "first pedal effort" and the APO_out may be referred herein as "second pedal effort." The APO_out is converted into torque by an engine of a vehicle (such as the vehicle 100, the vehicle 210, and the vehicle 330).

For example, as described above, the ECU or the PID controller of the controller may modify, convert, or map (collectively "adjust") the APO_in (or the first pedal effort) into the APO_out (or second pedal effort which may be recognized by the ECU or the engine to generate the accelerator torque output). As such, adjusted APO_in corresponds to the APO_out and such adjustment of the APO_in may lead to adjustment of the torque such that the actual mean APO can be brought closer to the target mean APO.

In some implementations, the ECU or the PID controller of the controller may set desired speed (e.g., target speed that a driver should aim for each of different types of road segment, average speed of the reference model, mean speed based on target mean APO) and/or target mean APO (such as the target mean APO described above), and adjust the APO_in and torque as described with respect to FIG. 3.

To illustrate, the ECU or the PID controller may set a goal (e.g., based on the reference model) to maintain a speed of 30 mph in the city road with the target mean APO of 15%, which is the recorded pedal pressing behavior of the reference driver(s), that a current driver of the vehicle should adapt to. Stated another way, a mean of the first pedal effort (actual mean APO) such as the actual mean APO described with respect to FIG. 3, should be brought closer to target mean APO of 15%. To do so, adjustment to the APO_in can be made to output corresponding APO_out and torque can be adjusted accordingly, and observation can be made as to whether the actual mean APO is being brought closer to the target mean APO.

For example, the ECU or the PID controller may set a goal (either with or without desired speed setting) in the highway road to reach target mean APO of 30%, which is the recorded pedal pressing behavior of the reference driver(s), that the current driver of the vehicle should adapt to with the mean of the first pedal effort (APO_in) of 30%. As such, the mean of the first pedal effort (APO_in) should be brought closer to target mean APO of 15%. To do so, adjustment to the APO_in can be made to output corresponding APO_out and torque can be adjusted accordingly, and observation can be made as to whether the actual mean APO is being brought closer to the target mean APO.

For example, after setting the desired speed and/or the target mean APO at particular road segment and making the adjustment to the first pedal effort (APO_in), the ECU or the PID controller may compute the error that corresponds to a difference between the target mean APO and the actual mean APO, and observation can be made as to whether the actual mean APO is being brought closer to the target mean APO, as described above with respect to FIG. 3.

Implementations for adjustment of the first pedal effort (APO_in) are explained with regards to the second graph 420 and the third graph 430.

The first graph 410 of FIG. 4A represents a scenario where the first pedal effort are equivalent to the second pedal effort at desired speeds in the certain road segment. This scenario illustrates a situation where no adjustment is being made to the APO_in. As such, APO_in is equivalent to APO_out in all parts of the first graph 410.

For example, when the target mean APO (e.g., 30%) is set in the certain road segment (e.g., highway road), and the current driver is or has been pressing the pedal such that the actual mean APO matches the target mean APO, no adjustment may be needed. For example, such scenario may correspond to a scenario where the actual mean APO of the actual APO distribution curve matches the target mean APO of the target APO distribution curve 306.

The second graph 420 of FIG. 4B represents a scenario where the second pedal effort is higher than the first pedal effort. This implies that it requires less first pedal effort (APO_in) to generate or adjust the torque (that is associated with second pedal effort or APO_out). In other words, the first pedal effort (APO_in) is adjusted into the second pedal effort (APO_out) based on control parameter (e.g., y-offset 428) such that for the same first pedal effort, torque is generated or adjusted to be higher than before applying the adjustment to first pedal effort (or when the first pedal effort is in 1:1 ratio with the second pedal effort).

For example, if the y-offset 428 is moved up, the first pedal effort (APO_in) may be mapped into (e.g., adjusted into) higher second pedal effort (APO_out) along an adjustment curve 425 such that the second pedal effort reflects higher APO value than the first pedal effort. This in turn adjusts or increases the torque to be higher than before mapping or adjusting the APO_in into the APO_out.

As such, the y-offset 428 may be used to determine which direction will the first pedal effort (APO_in) is mapped into and/or a degree of adjustment (e.g., based on how much torque need to be adjusted) of the first pedal effort (APO_in) into the second pedal effort (APO_out). In some implementations, the PID controller (or PID controller gains) can be tuned in such a way it controls a parameter to reduce the error (e.g., the mean error, the variance error). In some implementations, y-offset (such as the y-offset 428 and y-offset 438) can be determined or computed using the following equation:

$$y\text{-offset} = P\text{Gain}*\text{error} + I\text{Gain}*\text{error}*dt + D\text{Gain}*\text{error}/dt \quad (1)$$

In equation (1), dt corresponds to a time step or time difference between measurements, and PGain, IGain and DGain are gain values for the PID controller, which can be achieved by experimentation (e.g., trial and error). Error in this equation is the mean error that corresponds to a difference between the target mean APO and the actual mean APO.

In some implementations, the degree of adjustment may also be continuously learned by the PID controller, the ECU, or any feasible components by the vehicle.

For example, suppose that the driver is driving the vehicle on the highway road and the target mean APO set at 30%. Such target mean APO set at 30% is also represented by a dotted line 422, which may refer to a point where the y-offset 428 is computed or determined such that the first pedal efforts (APO_in) can be adjusted based on the y-offset 428 to output the second pedal efforts (APO_out).

After the first pedal effort (APO_in) is adjusted into the second pedal effort (APO_out) based on the y-offset 428, and such APO_out is converted into the torque that is applied to the vehicle, an error (such as the error described above with respect to FIG. 3) that corresponds to a difference between the target mean APO and the actual mean APO can be determined to see if the error is being reduced. If the error is being reduced, then adjustment to the APO_in is continuously made and applied in same direction of the y-offset 428 over the cycle of the process 320, until the error reaches the error threshold condition or zero. A first portion 424 and a second portion 426 of the second graph 420 simply represents skew lines that represent linearly increasing function. Since at 0% first pedal efforts (APO_in), the second pedal efforts (APO_out) is also 0%, and at 100% first pedal efforts (APO_in), the second pedal efforts (APO_out) is also 100%, and these are unchanged values, such linearly increasing function may result in the second graph 420 that includes the first portion 424 and the second portion 426. Same reasoning applies to the third graph 430 of FIG. 4C.

If the error is increasing, then the y-offset 428 can be moved to the opposite direction such as an y-offset 438 of the third graph 430 of FIG. 4C, until the error stabilizes or the error reaches the error threshold condition. As such, the y-offset 438 is the control parameter which controls the error.

The third graph 430 of FIG. 4C represents a scenario where the second pedal effort is lower than the first pedal effort. This implies that it requires more first pedal effort (APO_in) to generate or adjust the torque (that is associated with second pedal effort or APO_out). In other words, the first pedal effort (APO_in) into the second pedal effort (APO_out) based on control parameter (e.g., y-offset 438) such that for the same first pedal effort, torque is generated or adjusted to be lower than before applying the adjustment to first pedal effort (or when the first pedal effort is in 1:1 ratio with the second pedal effort).

For example, if the y-offset 438 is moved down, the first pedal effort (APO_in) may be mapped into (e.g., adjusted into) lower or reduced second pedal effort (APO_out) along adjustment curve 435 such that the second pedal effort reflects lower APO value than the first pedal effort. This in turn adjusts or decreases the torque to be lower than before mapping or adjusting the APO_in into the APO_out.

As such, the y-offset 438 may be used to determine which direction will the first pedal effort (APO_in) is mapped into and/or a degree of adjustment (e.g., based on how much torque need to be adjusted) of the first pedal effort (APO_in) into the second pedal effort (APO_out). Such degree of adjustment may also be continuously learned by the PID controller, the ECU, or any feasible components by the vehicle.

For example, suppose that the driver is driving the vehicle on the highway road and the target mean APO set at 60% at desired speed of 80 mph. Such target mean APO set at 60% is also represented by a dotted line 432, which may refer to a point where the y-offset 438 is computed or determined such that the first pedal efforts (APO_in) can be adjusted based on the y-offset 438 to output the second pedal efforts (APO_out).

After the first pedal effort (APO_in) is adjusted into the second pedal effort (APO_out) based on the y-offset 438, and such APO_out is converted into the torque that is applied to the vehicle, the error can be determined to see if the error is being reduced. If the error is being reduced, then adjustment to the APO_in is continuously made and applied in same direction of the y-offset 438. A first portion 434 and a second portion 436 of the third graph 430 simply represents skew lines that represent linearly increasing function. Since at 0% first pedal efforts (APO_in), the second pedal efforts (APO_out) is also 0%, and at 100% first pedal efforts (APO_in), the second pedal efforts (APO_out) is also 100%, and these are unchanged values, such linearly increasing function may result in the third graph 430 that includes the first portion 434 and the second portion 436.

If the error is increasing, then the y-offset 438 can be reversed or moved to the opposite direction such as the y-offset 428 of the second graph 420 of FIG. 4B, until the error stabilizes or the error reaches the error threshold condition as described above with respect to FIG. 3.

Figure 5A:
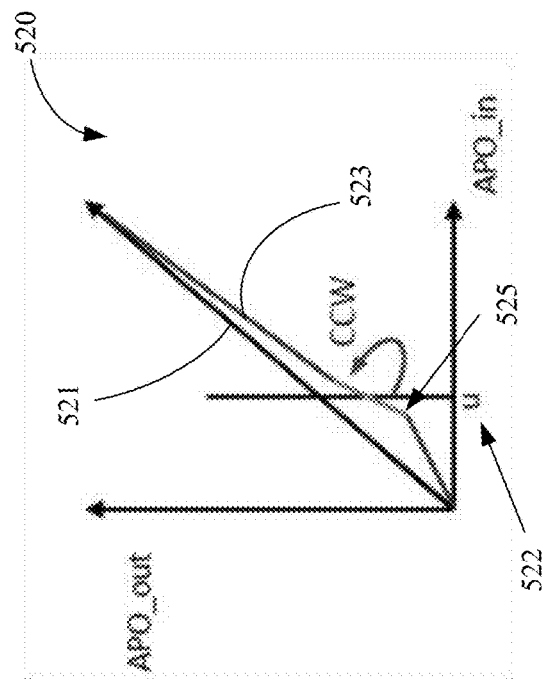
FIGS. 5A-5C depict example graphs illustrating different scenarios for creating and applying pedal adjustments.
Figure 5B:
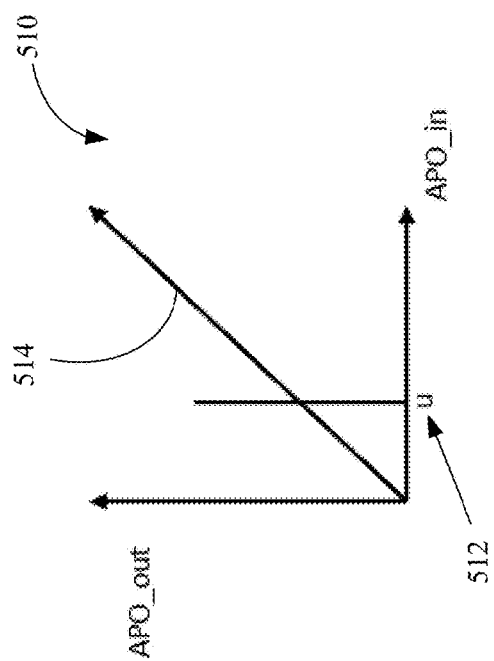
Figure 5C:
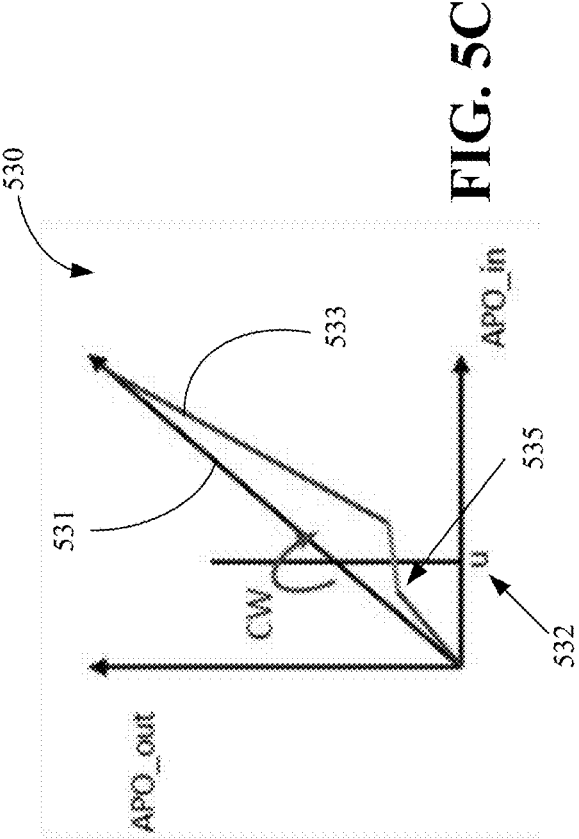

FIGS. 5A-5C depict example graphs (e.g., a first graph 510, a second graph 520, and a third graph 530) illustrating different scenarios or trends for creating and applying adjustments (such as the adjustment described with respect to step 324 and 326 of FIG. 3). The adjustment referred to in FIGS. 5A-5C may correspond to adjustment to the sensitivity of accelerator pedal.

After the target mean APO is selected, the ECU or the PID controller of the vehicle can create the adjustment to the sensitivity of the accelerator pedal such that, consequently, the standard deviation or the actual variance of the actual APO distribution curve or around the actual mean APO can be brought closer to the standard deviation or the target variance of the target APO distribution curve or around the target mean APO.

The first graph 510, the second graph 520, and the third graph 530 depict APO_out on the y-axis and APO_in on the x-axis. The APO_in on the x-axis may correspond to the APO input, the actual APO input, or the real-time APO as described above, which represents the degree or the extent as to how much the pedal has been pressed.

As described above with respect to FIGS. 4A-4C, the real-time APO or the APO_in (which is on the x-axis) may be the first pedal effort which are recognized by the APPS, and the APO_out (which is on the y-axis) may the second pedal effort which are recognized or converted by an ECU (such as the ECU of the controller 130) and/or converted into torque by an engine of a vehicle (such as the vehicle 100, the vehicle 210, and the vehicle 330). Moreover, the second pedal effort (APO_out) may be adjusted or induced to be adjusted by the controller. For example, the ECU or the PID controller of the controller may set a goal or desired speed, target mean and/or the target variance (such as the target variance described above with respect to FIG. 3)

based on the reference model, and adjust the sensitivity of accelerator pedal as described with respect to FIG. 3.

For example, when the driver presses the pedal according to, or close to the target mean APO, the ECU or the PID controller may compute a variance error that corresponds to a difference between the target variance (around the target mean APO) and the actual variance (around the actual mean APO) and then adjust the sensitivity of the accelerator pedal based on such variance error. Implementations based on computation of such variance error and adjusting of the sensitivity based on such error is explained with regards to the second graph 520 and the third graph 530).

The first graph 510 of FIG. 5A represents a scenario where an actual variance of an actual APO distribution is equivalent to a target variance of a distribution of a target mean APO 512 and no adjustment is being made to the sensitivity of the accelerator pedal. A reference curve 514, which has a slope of 1, illustrates that no adjustment or mapping is needed for the APO_in to generate the APO_out, since the ratio between APO_in and the APO_out is 1:1, meaning that they are equal through all points in the first graph 510.

The second graph 520 of FIG. 5B represents a scenario where an actual variance of an actual APO distribution is adjusted at around a target mean APO 522 and the sensitivity of the accelerator pedal is increased accordingly. For example, a curve 523 is skewed at a skew point 525 in a counterclockwise direction (making a slope of the curve 523 greater than 1), which corresponds to increasing the sensitivity of the accelerator pedal. For example, such skewing (e.g., increasing or decreasing the slope of the curve 523) corresponds to controlling the sensitivity of the accelerator pedal and a width of a probability or a frequency distribution of an actual APO distribution curve (e.g., the actual APO distribution curve 304). For example, increasing the sensitivity of the accelerator pedal or skewing the curve in the counterclockwise direction may lead to decreasing the actual variance and narrowing the width of the actual APO distribution curve, as described above with respect to the width of the actual APO distribution curve 314 of FIG. 3. For example, prior to the skew point 525 the curve 523 had a slope of less than 1 (compared to a reference curve 521 that has a slope of 1), but after the skew point 525 at around a target mean APO 522, the curve 523 has a slope greater than 1, which represents that the sensitivity of the accelerator pedal is increased.

Moreover, after the sensitivity of the accelerator pedal is adjusted (e.g., increased or reduced), observation can be made as to whether a standard deviation or the actual variance around the actual mean APO is being brought closer to a target standard deviation or the target variance around the target mean APO. For example, the observation can be made as to whether a variance error that corresponds to a difference between the target variance and the actual variance is being reduced. For example, the observation can be made as to whether the variance error is reaching a variance error threshold condition as described above with respect to FIG. 3.

The third graph 530 of FIG. 5C represents a scenario where an actual variance of actual APO distribution is adjusted at around a target mean APO 532 and the sensitivity of the accelerator pedal is decreased accordingly. For example, the curve 533 is skewed at a skew point 535 in a clockwise direction (making a slope of the curve 533 less than 1 compared to a reference curve 531 that has a slope of 1), which corresponds to decreasing the sensitivity of the accelerator pedal. For example, such skewing (e.g., increas-ing or decreasing the slope of the curve 533) corresponds to controlling the sensitivity of the accelerator pedal and a width of a probability or a frequency distribution of an actual APO distribution curve (e.g., the actual APO distribution curve 304). For example, decreasing the sensitivity of the accelerator pedal or skewing the curve in the clockwise direction may lead to increasing the actual variance and widening the width of the actual APO distribution curve.

Such scenario of decreasing the sensitivity of the accelerator pedal may be purposely used by an expert driver or other driver who wants to train or practice more flexibility and control in the accelerator pedal.

Figure 6A:
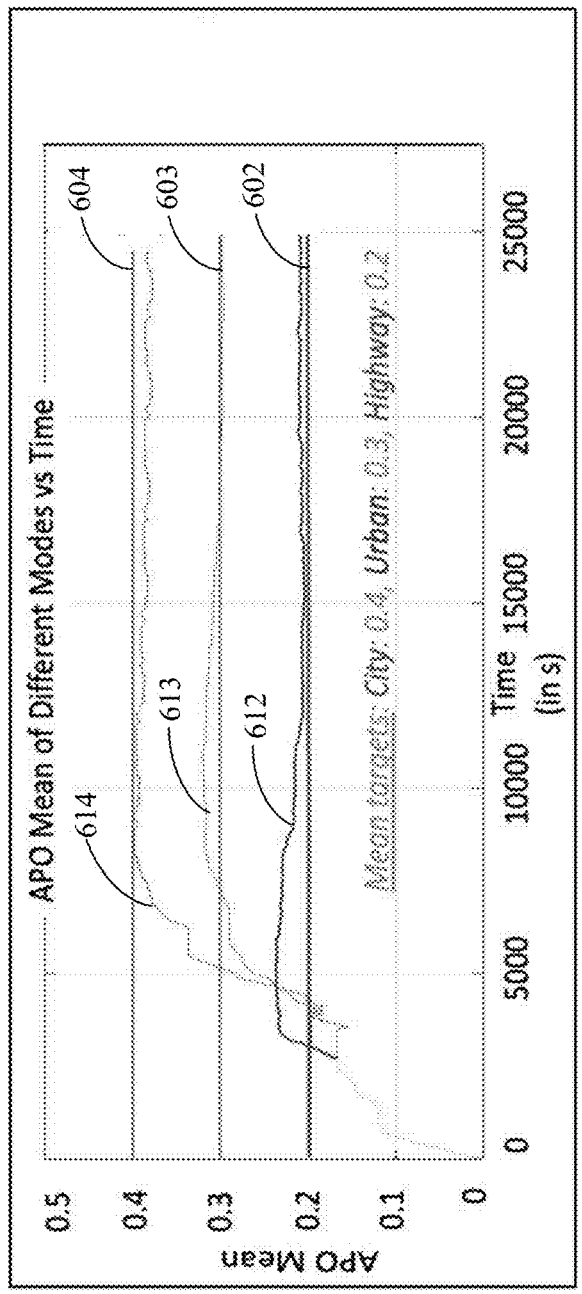
FIGS. 6A-6B illustrate example graphs that illustrate simulation results of applying pedal adjustments such that actual mean accelerator pedal output and actual variance reach target mean accelerator pedal output and target variance of different modes based on different types of road segments.

FIG. 6A depicts an example of an APO mean of different mode graph 600 that illustrates simulation results of creating adjustments (e.g., adjustment to actual APO input and torque) to induce a real-time APO mean to reach target APO mean of different modes based on type of a road segment. The APO mean of different mode graph 600 has APO mean on y-axis and time on x-axis. Three sets of target APO mean values are city mode target APO mean 604, an urban mode target APO mean 603, and a highway mode target APO mean 602.

For example, the city mode target APO mean 604 is set at 0.4, the urban mode target APO mean 603 is set at 0.3, and the highway mode target APO mean 602 is set at 0.2.

For example, the APO mean of different mode graph 600 depicts that a real-time APO mean for a city mode 614 is getting close to the city mode target APO mean 604 at around 7000 seconds.

For example, the APO mean of different mode graph 600 depicts that a real-time APO mean for an urban mode 613 is getting close to the urban mode target APO mean 603 at around 6000 seconds.

For example, the APO mean of different mode graph 600 illustrates that a real-time APO mean for a highway mode 612 is getting close to the highway mode target APO mean 602 at around 8000 seconds.

Figure 6B:
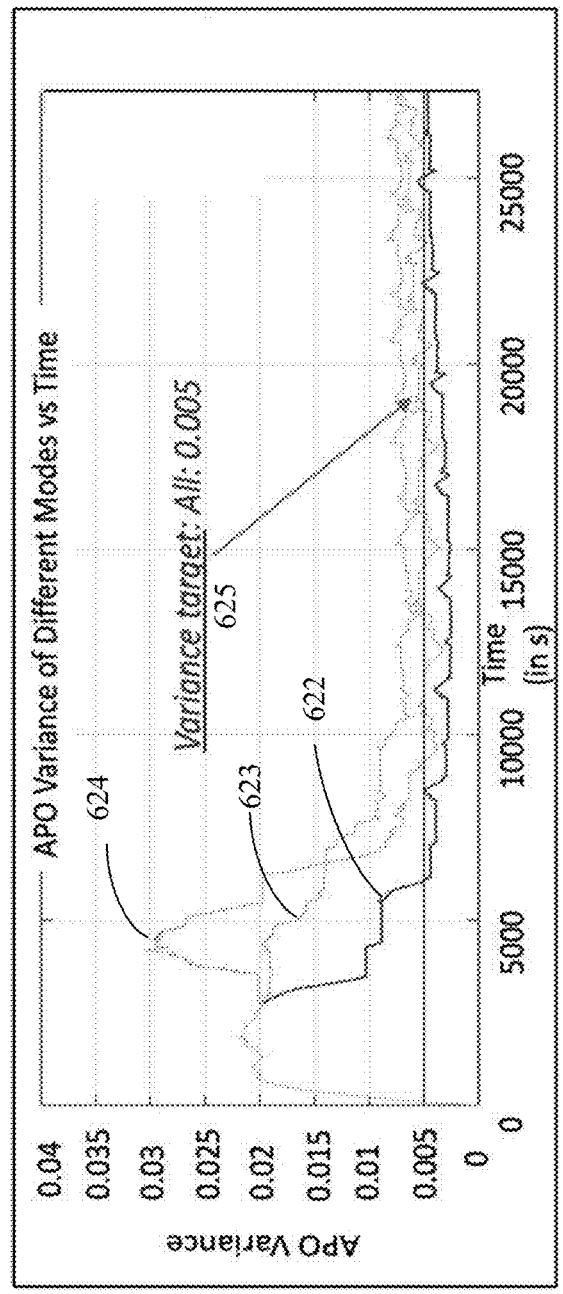

FIG. 6B depicts an example of an APO variance of different mode graph 620 that illustrates simulation results of creating adjustments (e.g., sensitivity of accelerator pedal) to induce an actual variance (a real-time APO variance) to reach target variance (target APO variance) of different modes based on type of a road segment. The APO variance of different mode graph 620 has APO variance on y-axis and time on x-axis. All three sets of target APO variance values are equivalent in this graph, with the target APO variance 625 of 0.5 for city mode target APO variance, an urban mode target APO variance, and a highway mode target APO variance.

For example, the APO variance of different mode graph 620 illustrates that a real-time APO variance for a city mode 624, a real-time APO variance for an urban mode 623, and a real-time APO variance for a highway mode 622 all reach toward the target APO variance 625.

Figure 7:
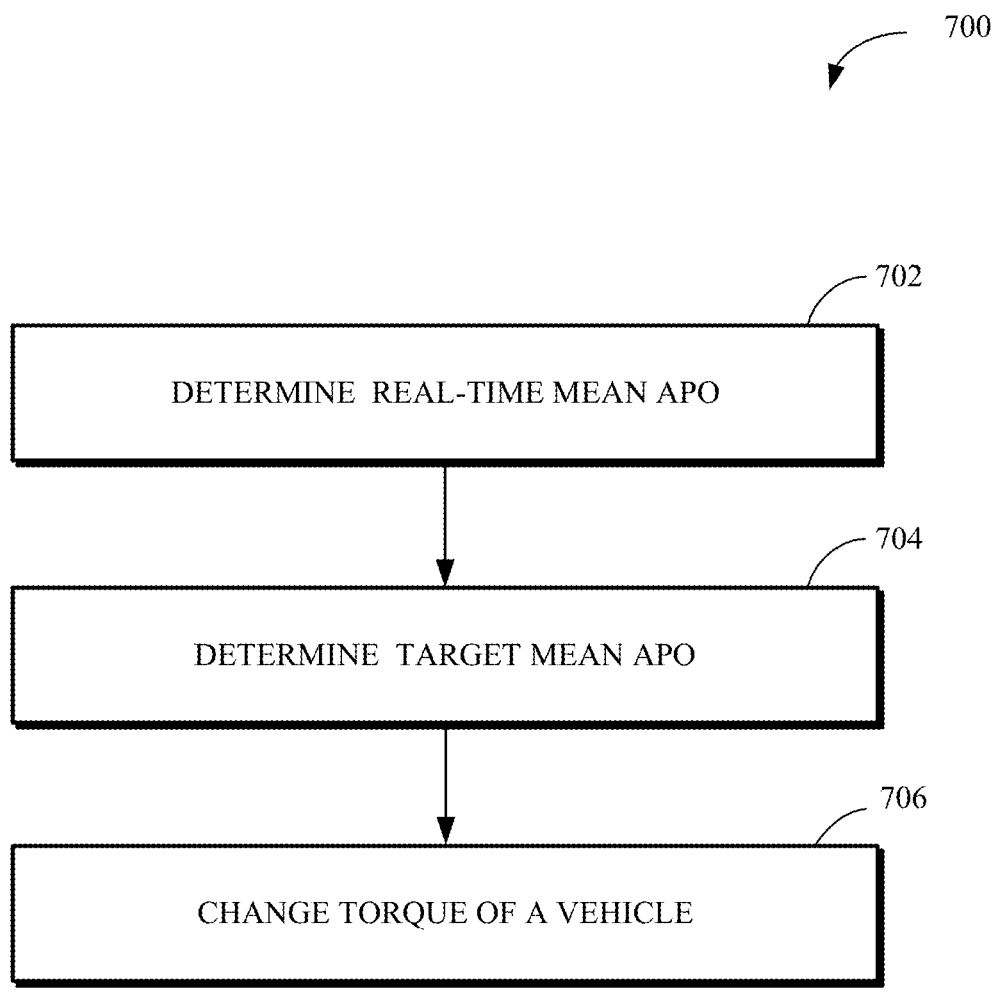
FIG. 7 is a flowchart diagram of an example of a technique for adjusting an accelerator pedal responsiveness.

FIG. 7 is a flowchart diagram of an example of a technique 700 for adjusting an accelerator pedal responsiveness. The technique 700 can be implemented by using a processor of a vehicle (such as the processor 133), a controller (such as the controller 130 that includes the ECU and the PID controller), sensor(s) of the vehicle (such as the sensors 136 that includes APPS and TPS), and other components of the vehicle. Moreover, the technique 700 can be implemented using the vehicle (e.g., the vehicle 100, the vehicle 210, and the vehicle 330), vehicle transportation and communication system 200, any system, components, graphs, and implementations depicted and described with respect to FIGS. 3-6B.

At 702, a mean of the real-time APO is determined. The real-time APO may quantify an extent to which an accelerator pedal has been pressed by a driver of the vehicle over a defined period of time. For example, the real-time APO may correspond to APO data taken over the defined period of time (e.g., few hours, few days, few weeks). For example, the real-time APO may correspond to a frequency or probability distribution corresponding to the APO data taken over the defined period of time (e.g., the actual APO distribution curve 304). For example, the mean of the real-time APO may correspond to average or mean of the frequency or probability distribution corresponding to the APO data (e.g., the actual mean APO described throughout this disclosure). Such frequency or the probability distribution may represent a current pedal pressing behavior of a driver.

At 704, a target mean APO is determined. Determining the target mean APO may first include determining whether a real-time speed of the vehicle falls within a pre-defined speed range of a road that the vehicle is traversing. The road may correspond to a one of a city road, an urban road, a rural road, or a highway road. For example, if the vehicle is traversing on the highway road, then determination as to whether the vehicle is traveling within the pre-defined speed range of the highway (e.g., 65-75 mph) can be made. For example, if the vehicle is traversing on a city road, then determination as to whether the vehicle is traveling within the pre-defined speed range of the city road (e.g., 25-35 mph) can be made. For example, determining whether the real-time speed of the vehicle falls within the pre-defined speed range of a road that the vehicle is traversing may indicate whether or not there is a traffic congestion.

Responsive to determining that the real-time speed of the vehicle falls within the pre-defined speed range of the road that the vehicle is traversing, the target mean APO may be identified based on a type of the road that the vehicle is traversing. The target mean APO represents an average pedal pressing behavior of the reference model or reference driver(s) (e.g., expert driver(s), multiple drivers, model novice driver(s), and/or model average driver(s)) at the road. As described above, the average pedal pressing behavior of the reference driver(s) at the road is determined based on an observed pedal pressing behavior (e.g., recorded pedal pressing behavior, pedal pressing behavior histogram, pedal pressing behavior history) of the reference driver(s). Moreover, the average pedal pressing behavior of the model driver(s) varies depending on different types of the road, as described above with respect to FIGS. 6A-6B.

In some implementations, the target mean APO may be identified based on a drive mode selected. For example, depending on a type of the drive mode that includes of a comfort drive mode, sport drive mode, eco drive mode, snow drive mode, and a wet drive mode, throttle response and/or pedal sensitivity may be different. As such, the target mean APO may differ based on the type of the drive mode that was used in the observed pedal pressing behavior of the model driver(s).

In some implementations, determining the target mean APO may be based on both the type of the road that the vehicle is traveling on, and the drive mode selected.

In addition to determining the target mean APO, target variance (or target standard deviation) may be determined. For example, target variance may be automatically determined when the target mean APO is selected based on the type of the road that the vehicle is traversing and/or the drive mode.

In some implementations, determining the target variance may include the driver manually selecting one of pedal pressing mode that includes a high sensitivity-low target variance mode and a low sensitivity-high target variance mode. For example, the driver may manually select one of pedal pressing mode based on preference of the driver. For example, when the driver drives or plans to drive on the highway, the driver may select low sensitivity-high target variance mode. For example, when the drive drives or plans to drive on the city, the driver may select high sensitivity-low target variance mode.

In some implementations, in addition to determining the target mean APO, target standard deviation may be determined in supplant of the target variance in a same manner as described above with respect to determining the target variance.

In some implementations, target mean APO may be determined based on scene understanding. The scene understanding may involve processing data from various sensors (e.g., the sensors 136) of the vehicle to detect features of physical environment surrounding the vehicle and creating a detailed representation of the physical environment. This can include identifying other vehicles, pedestrians, cyclists, road signs, traffic signals, lane markings, etc. Moreover, HD map data can be used in addition to such data obtained from the sensors to predict and interpret the traffic situation, and type of current road or upcoming road that the vehicle will be traversing. As such, the scene understanding can be used to determine the type of the road that the vehicle is traversing or will traverse. For example, responsive to determining the type of the road that the vehicle is or will be traversing based on the scene understanding, the processor or the controller of the vehicle may automatically select corresponding mode (e.g., highway mode, city mode, urban mode, rural mode) that is associated with reference model (and thus, the target mean APO). Moreover, determination regarding traffic congestion of the road and/or whether a real-time speed of the vehicle falls within the pre-defined speed range of the road can be determined prior to determining and/or selecting the target mean APO. For example, when there is a traffic congestion in the city road, then the vehicle may not determine or select the target mean APO and may not proceed with creating and applying adjustments of torque of the vehicle and/or sensitivity of the accelerator pedal. Moreover, type of drive mode selected can be factored into in addition to the scene understanding, type of the road, and/or traffic congestion factors in determining the target mean APO.

At 706, torque of the vehicle is changed based on the target mean APO.

Changing or adjusting the torque may include first using the ECU or the PID controller to adjust or map the real-time APO (e.g., the APO_in in FIGS. 3-5C) to different APO (e.g., the APO_out in FIGS. 3-5C), as described above with respect to FIGS. 3-4C.

Changing the torque may include reducing the torque when the mean of the real-time APO is lower than the target mean APO. For example, responsive to determining that the mean of the real-time APO is lower than the target mean APO, the torque may be reduced.

Changing the torque may include increasing the torque when the mean of the real-time APO is higher than the target mean APO. For example, responsive to determining that the mean of the real-time APO is higher than the target mean APO, the torque may be increased.

As a first example, in situations where the driver is not pressing, on average, the pedal enough to match the target mean APO (or when the mean of the real-time APO is lower than the target mean APO), and/or driving at higher speed (e.g., 80 mph) than desired speed range or the desired speed (e.g., speed limit for the highway road, the speed limit that corresponds to the target mean APO, target speed), it may be necessary to induce the vehicle to recognize that with the same amount of current first pedal efforts (APO_in), speed needs to be reduced, or induce the driver to press the pedal more or deeper (e.g., increase the first pedal efforts (APO_in)) in outputting a current speed (e.g., 80 mph). To induce the driver to press the pedal more or deeper, the torque that is being converted to a current speed (e.g., around 70 mph) can be reduced such that the current speed is reduced and the driver needs to press the pedal more (e.g., the actual APO of 30%) to maintain the desired speed range or the desired speed. If the driver ends up pressing the pedal more or deeper such that mean of the real-time APO is brought closer to the target mean APO, then the torque may be continuously adjusted (in this example, reduced) until an error (difference between the target mean APO and the real-time APO) is minimized or reach an error threshold condition, as described with respect to FIGS. 3 and 4A-4C. If the error is increased or the driver ends up pressing the pedal to the lesser extent in this example, then the direction of the torque adjustment may be reversed (in this case increased) to minimize the error.

As a second example, in situations where the driver is pressing the pedal more than needed to match the target mean APO (or when the mean of the real-time APO is higher than the target mean APO), and/or driving at lower speed than the desired speed, it may be necessary to induce the driver to press the pedal to a lesser extent. To make the driver to press the pedal less, the torque that is being converted to the current speed can be increased such that the current speed is increased, and the driver needs to press the pedal less (e.g., the actual APO of 30%) to maintain the desired speed. If the driver ends up pressing the pedal to the lesser extent such that mean of the real-time APO is brought closer to the target mean APO, then the torque may be continuously adjusted (in this example, increased) until the error (difference between the target mean APO and the real-time APO) is minimized to reach the error threshold condition. If the error is increased or the driver ends up pressing the pedal more or deeper in this example, then the direction of the torque adjustment may be reversed (in this case decreased) to minimize the error.

As such, changing the torque based on the target mean APO may result in changing the mean of the frequency or probability distribution of the real-time APO data (e.g., the actual APO distribution curve 304) such that the mean of the frequency of the probability distribution of APO data gets closer to the target mean APO (e.g., the target mean APO of the target APO distribution curve 306), as described above with respect to FIGS. 3 and 4A-4C. Moreover, observation as to whether the error is being reduced or increased, or reaching the error threshold condition can be determined. If the error is being reduced, the adjustment to the torque can be continuously made in that direction until the error threshold condition is reached or error becomes zero. If the error is rather increased, then the adjustment of the torque can be reversed in the other direction and further observation can be made as to whether the error is being reduced. Such technique of changing or adjusting torque based on the target mean APO can be viewed in conjunction with techniques described in FIGS. 3 and 4A-4C.

Moreover, in some implementations, after or responsive to determining that the mean of the real-time APO matches the target mean APO or falls within a threshold value (e.g., acceptable amount of error or difference between the mean of the real-time APO and the target mean APO, margin of error) based on the target mean APO, a sensitivity of the accelerator pedal can be changed such that a standard deviation or a variance of a frequency or probability distribution of the real-time APO approaches a standard deviation or a variance of a frequency or a probability distribution corresponding to the target mean APO. For example, changing the sensitivity of the accelerator pedal based on the target mean APO may include changing a variance of the frequency or the probability distribution of the real-time APO or APO data. (e.g., the actual APO distribution curve 304) such that the variance value gets closer to a target variance of a frequency or a probability distribution of the target mean APO, as described above with respect to FIGS. 3 and 5A-5C. For example, increasing the sensitivity of the accelerator pedal may correspond to decreasing the variance of the frequency or probability distribution of the real-time APO or APO data. For example, decreasing the sensitivity of the accelerator pedal may correspond to increasing the variance of the frequency or probability distribution of the real-time APO or APO data. In some implementations, changing the sensitivity of the accelerator pedal based on the target mean APO may include changing a standard deviation (instead of variance) of the frequency or the probability distribution of the APO data. The standard deviation may be changed in a same manner as described above with respect to changing the variance.

Moreover, in some implementations, prior to determining that the mean of the real-time APO matches the target mean APO or falls within the threshold value (e.g., acceptable amount of error or difference between the mean of the real-time APO and the target mean APO, margin of error), or while the mean of the real-time APO is still changing, the sensitivity of the accelerator pedal can be changed such that a standard deviation or a variance of a frequency or probability distribution of the real-time APO approaches a standard deviation or a variance of a frequency or a probability distribution corresponding to the target mean APO. In some implementations, the torque of the vehicle and the sensitivity of the accelerator pedal may be changed simultaneously.

Figure 8:
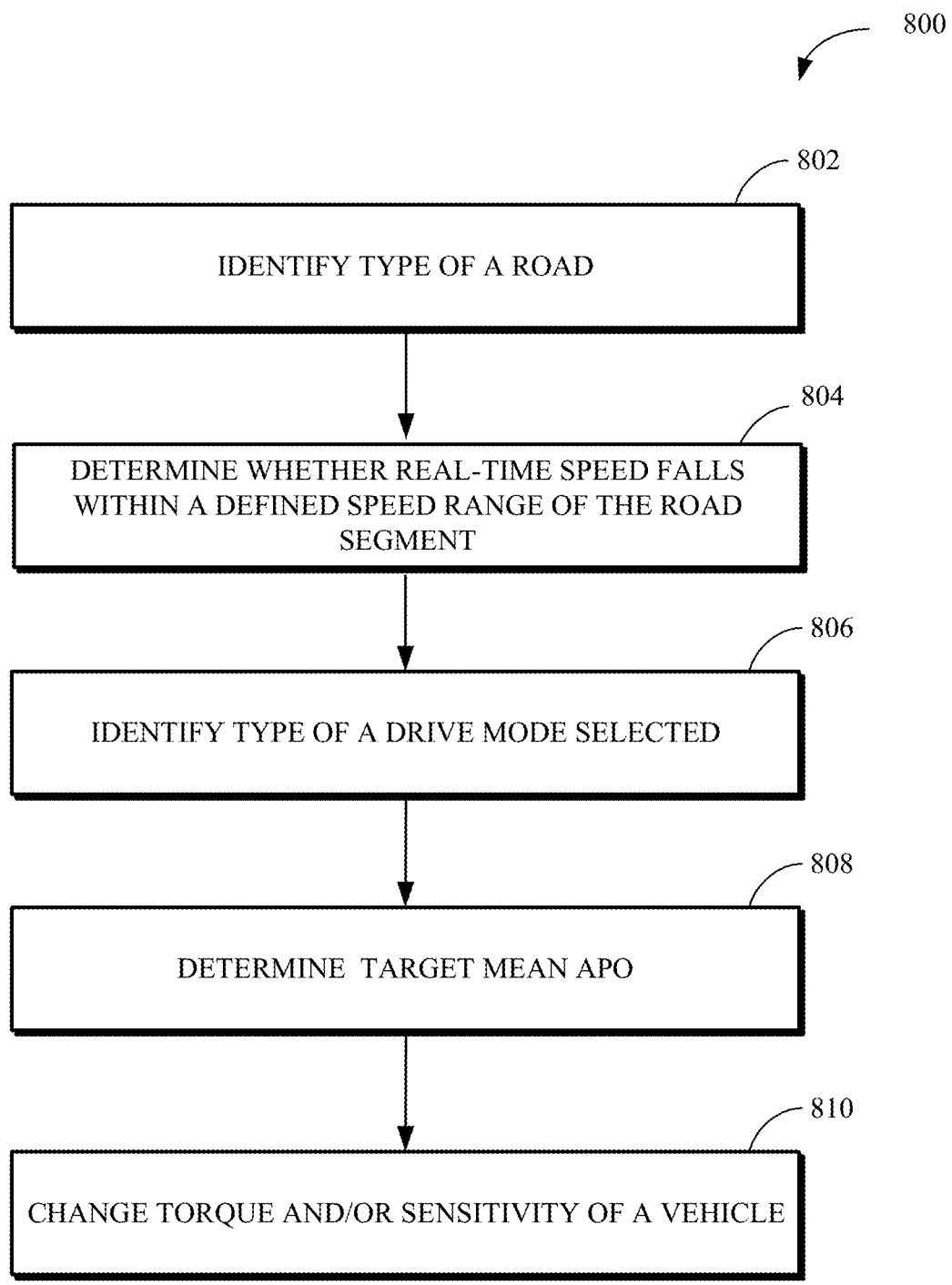
FIG. 8 is a flowchart diagram of an example of a technique for adjusting an accelerator pedal responsiveness based on type of a road segment and a drive mode.

FIG. 8 is a flowchart diagram of an example of a technique 800 for adjusting an accelerator pedal responsiveness based on type of a road segment and a drive mode.

The technique 800 can be implemented by using a processor of a vehicle (such as the processor 133), a controller (such as the controller 130 that includes the ECU and the PID controller), sensor(s) of the vehicle (such as the sensors 136 that includes APPS and TPS), and other components of the vehicle. Moreover, the technique 800 can be implemented using the vehicle (e.g., the vehicle 100, the vehicle 210, and the vehicle 330), vehicle transportation and communication system 200, any system, components, graphs, and implementations depicted and described with respect to FIGS. 3-7.

At 802, a type of a road that the vehicle is traveling on is identified. For example, the road may correspond to a one of a city road, an urban road, a rural road, or a highway road.

At 804, whether real-time speed falls within a defined speed range of the road segment is determined. For example, if the vehicle is traversing on a highway road, then determination as to whether the vehicle is traveling within the pre-defined speed range of the highway (e.g., 65-75 mph) can be made. For example, if the vehicle is traversing on a city road, then determination as to whether the vehicle is traveling within the pre-defined speed range of the city road (e.g., 25-35 mph) can be made.

At 806, a drive mode selected by the driver of the vehicle is identified. For example, the drive mode may correspond to a one of a comfort mode, a sport mode, an eco-mode, a snow mode, or a wet mode.

At 808, a target mean APO may be determined. For example, the target mean APO may be identified based on the type of the road that the vehicle is traveling on and the drive mode selected by the driver or that the vehicle is traveling with. The target mean APO may be identified in a similar manner as described with respect to step 704 of FIG. 7, so the technique will not be repeated here.

At 810, torque of the vehicle and/or sensitivity of the accelerator pedal may be changed. A technique for changing the torque and/or the sensitivity may be similar to the technique described above with respect to step 706 of FIG. 7, so the technique will not be repeated here.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment." "implementation," "aspect," "feature." or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for adjusting an accelerator pedal responsiveness, the method comprising:
   determining a mean of a real-time accelerator pedal output of a vehicle, wherein the real-time accelerator pedal output quantifies an extent to which an accelerator pedal has been pressed by a driver of the vehicle over a defined period of time;
   determining a target mean accelerator pedal output for the vehicle, wherein the target mean accelerator pedal output represents an average pedal pressing behavior of a reference driver, and wherein the average pedal pressing behavior of the reference driver is determined based on an observed pedal pressing behavior history of the reference driver, and wherein the average pedal pressing behavior of the reference driver at a road that the vehicle is traversing is determined based on an observed pedal pressing behavior history of the reference driver; and
   changing a torque of the vehicle based on the target mean accelerator pedal output, wherein changing the torque comprises:
      reducing the torque when the mean of the real-time accelerator pedal output is lower than the target mean accelerator pedal output; and
      increasing the torque when the mean of the real-time accelerator pedal output is higher than the target mean accelerator pedal output.

2. The method of claim 1, wherein determining the target mean accelerator pedal output for the vehicle comprises:
   determining whether a real-time speed of the vehicle falls within a pre-defined speed range of the road that the vehicle is traversing; and
   responsive to determining that the real-time speed of the vehicle falls within the pre-defined speed range, identifying the target mean accelerator pedal output based on a type of the road that the vehicle is traversing.

3. The method of claim 2, wherein the road corresponds to a one of a city road, an urban road, a rural road, or a highway road.

4. The method of claim 2, wherein the reference driver consists of multiple drivers.

5. The method of claim 1, wherein determining the target mean accelerator pedal output for the vehicle comprises:
   identifying a drive mode selected, wherein the drive mode corresponds to a one of a comfort drive mode, sport drive mode, eco drive mode, snow drive mode, and a wet drive mode; and
   identifying, based on a type of a road that the vehicle is traversing and the drive mode, the target mean accelerator pedal output.

6. The method of claim 1, further comprising:
   responsive to determining that the mean of the real-time accelerator pedal output matches the target mean accelerator pedal output or a threshold value based on the target mean accelerator pedal output, changing a sensitivity of the accelerator pedal such that a variance of a frequency or probability distribution of the real-time accelerator pedal output approaches a variance of a frequency or probability distribution corresponding to the target mean accelerator pedal output.

7. The method of claim 6, wherein:
decreasing the variance of the frequency or probability distribution of the real-time accelerator pedal output corresponds to increasing the sensitivity of the accelerator pedal; and
increasing the variance of the frequency or probability distribution of the real-time accelerator pedal output corresponds to decreasing the sensitivity of the accelerator pedal.

8. A vehicle, comprising:
a memory; and
a processor configured to:
  determine a mean of a real-time accelerator pedal output of the vehicle, wherein the real-time accelerator pedal output quantifies an extent to which an accelerator pedal has been pressed by a driver of the vehicle over a defined period of time;
  determine a target mean accelerator pedal output for the vehicle, wherein the target mean accelerator pedal output represents an average pedal pressing behavior of a reference driver, and wherein the average pedal pressing behavior of the reference driver is determined based on an observed pedal pressing behavior history of the reference driver, and wherein the average pedal pressing behavior of the reference driver at a road that the vehicle is traversing is determined based on an observed pedal pressing behavior history of the reference driver; and
  change a torque of the vehicle based on the target mean accelerator pedal output, wherein to change the torque comprises to:
    reduce the torque when the mean of the real-time accelerator pedal output is lower than the target mean accelerator pedal output; and
    increase the torque when the mean of the real-time accelerator pedal output is higher than the target mean accelerator pedal output.

9. The vehicle of claim 8, wherein to determine the target mean accelerator pedal output of the vehicle comprises to:
determine whether a real-time speed of the vehicle falls within a pre-defined speed range of the road that the vehicle is traversing; and
responsive to determining that the real-time speed of the vehicle falls within the pre-defined speed range, identify the target mean accelerator pedal output based on a type of the road that the vehicle is traversing.

10. The vehicle of claim 9, wherein the road corresponds to a one of a city road, an urban road, a rural road, or a highway road.

11. The vehicle of claim 9, wherein the reference driver consists of multiple drivers.

12. The vehicle of claim 8, wherein to determine the target mean accelerator pedal output for the vehicle comprises to:
identify a drive mode selected, wherein the drive mode corresponds to a one of a comfort drive mode, sport drive mode, eco drive mode, snow drive mode, and a wet drive mode; and
identify, based on a type of a road that the vehicle is traversing and the drive mode, the target mean accelerator pedal output.

13. The vehicle of claim 8, wherein the processor is further configured to:
responsive to determining that the mean of the real-time accelerator pedal output matches the target mean accelerator pedal output or a threshold value based on the target mean accelerator pedal output, change a sensitivity of the accelerator pedal such that a variance of a frequency or probability distribution of the real-time accelerator pedal output approaches a variance of a frequency or probability distribution corresponding to the target mean accelerator pedal output.

14. The vehicle of claim 13, wherein:
to decrease the variance of the frequency or probability distribution of the real-time accelerator pedal output corresponds to increase the sensitivity of the accelerator pedal; and
to increase the variance of the frequency or probability distribution of the real-time accelerator pedal output corresponds to decrease the sensitivity of the accelerator pedal.

15. A non-transitory computer readable medium storing instructions that, when executed by one or more processors, to-perform operations comprising:
determining a real-time accelerator pedal output of a vehicle, wherein the real-time accelerator pedal output quantifies an extent to which an accelerator pedal has been pressed by a driver of the vehicle over a defined period of time;
determining a target mean accelerator pedal output and a target variance for the vehicle based on a type of a road that the vehicle is traversing, wherein the target mean accelerator pedal output represents an average pedal pressing behavior of a reference driver, and wherein the average pedal pressing behavior of the reference driver is determined based on an observed pedal pressing behavior history of the reference driver, and wherein the average pedal pressing behavior of the reference driver at the road is determined based on an observed pedal pressing behavior history of the reference driver; and
changing a sensitivity of the accelerator pedal based on the target variance, wherein the target variance corresponds to a variance of a frequency or probability distribution corresponding to the target mean accelerator pedal output.

16. The non-transitory computer readable medium of claim 15, wherein determining the target mean accelerator pedal output for the vehicle comprises:
determining whether a real-time speed of the vehicle falls within a pre-defined speed range of the road that the vehicle is traversing; and
responsive to determining that the real-time speed of the vehicle falls within the pre-defined speed range, identifying the target mean accelerator pedal output and the target variance based on the type of the road that the vehicle is traversing.

17. The non-transitory computer readable medium of claim 16, wherein the road corresponds to a one of a city road, an urban road, a rural road, or a highway road.

18. The non-transitory computer readable medium of claim 16, wherein the reference driver consists of multiple drivers.

19. The non-transitory computer readable medium of claim 15, wherein determining the target mean accelerator pedal output and the target variance for the vehicle comprises:

identifying a drive mode selected, wherein the drive mode corresponds to a one of a comfort drive mode, sport drive mode, eco drive mode, snow drive mode, and a wet drive mode; and identifying, based on the type of the road that the vehicle is traversing and the drive mode, the target mean accelerator pedal output and the target variance.

20. The non-transitory computer readable medium of claim 15, wherein changing the sensitivity of the accelerator pedal based on the target variance comprises:

adjusting the sensitivity of the accelerator pedal such that a variance of a frequency or probability distribution of the real-time accelerator pedal output approaches the target variance.

\* \* \* \* \*